(12) United States Patent
Brugger et al.

(10) Patent No.: US 10,262,061 B2
(45) Date of Patent: Apr. 16, 2019

(54) HIERARCHICAL DATA CLASSIFICATION USING FREQUENCY ANALYSIS

(71) Applicant: Oracle International Corporation, Redwood Shores, CA (US)

(72) Inventors: Gerhard Brugger, Los Angeles, CA (US); John Eric Baum, Thousand Oaks, CA (US); Filippo Ferdinando Paolo Beghelli, London (GB); Charles Wilson, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 852 days.

(21) Appl. No.: 14/716,554

(22) Filed: May 19, 2015

(65) Prior Publication Data

US 2016/0342589 A1 Nov. 24, 2016

(51) Int. Cl.
*G06F 17/30* (2006.01)

(52) U.S. Cl.
CPC .............................. *G06F 17/30705* (2013.01)

(58) Field of Classification Search
CPC ................................................ G06F 17/30705
USPC .................................................. 707/740, 741
See application file for complete search history.

(56) References Cited

U.S. PATENT DOCUMENTS 7,231,379 B2 * 6/2007 Parikh ............... G06F 17/30011
7,797,303 B2 9/2010 Roulland et al.
8,204,751 B1 6/2012 Di et al.
8,423,350 B1 4/2013 Chandra et al.
9,582,493 B2 2/2017 Nauze et al.
9,678,946 B2 6/2017 Nauze et al.
9,842,102 B2 12/2017 Salome et al.
2006/0122834 A1 6/2006 Bennett
2007/0130194 A1 6/2007 Kaiser (Continued)

FOREIGN PATENT DOCUMENTS

| EP | 927939 A1 | 7/1999 |
|---|---|---|
| WO | 2016077015 | 5/2016 |
| WO | 2016077016 | 5/2016 |

OTHER PUBLICATIONS

Bretschneider, et al. "Corpus-based Translation of Ontologies for Improved Multilingual Semantic Annotation", Proceedings of the third workshop on semantic web and information extraction, Aug. 24, 2014, pp. 1-8.

(Continued)

*Primary Examiner* — Chelcie L Daye
(74) *Attorney, Agent, or Firm* — Kraguljac Law Group, LLC

(57) ABSTRACT

A method of classifying individual documents in a document collection according to a hierarchy may include selecting an object from the hierarchy, generating one or more variants for the object, and for each of the one or more variants, determining a frequency threshold based at least in part on how frequently the one or more variants occurs in the document collection. The method may also include selecting a first document in the document collection, where the first document includes one or more objects that match at least one of the one or more variants. The method may additionally include determining that the number of the one or more objects exceeds the frequency threshold and classifying the first document with the object in the hierarchy.

20 Claims, 11 Drawing Sheets

(56) References Cited

U.S. PATENT DOCUMENTS

| | | | |
|---|---|---|---|
| 2011/0087670 A1* | 4/2011 | Jorstad | G06F 17/277 |
| | | | 707/741 |
| 2013/0260358 A1 | 10/2013 | Lorge et al. | |
| 2014/0278362 A1 | 9/2014 | Gerken, III et al. | |
| 2015/0309992 A1 | 10/2015 | Visel | |
| 2015/0347543 A1 | 12/2015 | Sinha et al. | |
| 2016/0132482 A1 | 5/2016 | Salome et al. | |
| 2016/0132484 A1 | 5/2016 | Nauze et al. | |
| 2016/0132487 A1 | 5/2016 | Nauze et al. | |
| 2016/0163312 A1 | 6/2016 | Henton et al. | |
| 2016/0188570 A1 | 6/2016 | Lobez et al. | |

OTHER PUBLICATIONS

Espinoza, et al. "Ontology Localization", Proceedings of the Fifth International Conference on Knowledge Capture, K-Cap-09, Sep. 4, 2009, p. 33.

Vossen, et al. "KYOTO: an open platform for mining facts" In: "Handbook of Research on Culturally-Aware Information Technology", Aug. 31, 2010, IGI Global, 1-10.

International Search Report and Written Opinion of PCT/US2015/055490 dated Jan. 21, 2016, all pages.

International Search Report and Written Opinion of PCT/US2015/055489 dated Jan. 25, 2016, all pages.

U.S. Appl. No. 14/793,658, Non-Final Office Action dated May 5, 2016, 7 pages.

U.S. Appl. No. 14/793,658, Notice of Allowance dated Oct. 17, 2016, 8 pages.

U.S. Appl. No. 14/793,677, Notice of Allowance dated Feb. 17, 2017, 8 pages.

U.S. Appl. No. 14/793,701, Final Office Action dated Mar. 23, 2017, 12 pages.

U.S. Appl. No. 14/793,701, Advisory Action dated Jun. 14, 2017, 3 pages.

International Application No. PCT/US2015/055489, International Preliminary Report on Patentability dated May 26, 2017, 10 pages.

International Application No. PCT/US2015/055490, International Preliminary Report on Patentability dated May 26, 2017, 9 pages.

U.S. Appl. No. 14/793,677, Non-Final Office Action dated Sep. 20, 2016, 5 pages.

U.S. Appl. No. 14/793,701, Non-Final Office Action dated Aug. 5, 2016, 7 pages.

U.S. Appl. No. 14/793,701, Notice of Allowance dated Jul. 28, 2017, 10 pages.

* cited by examiner

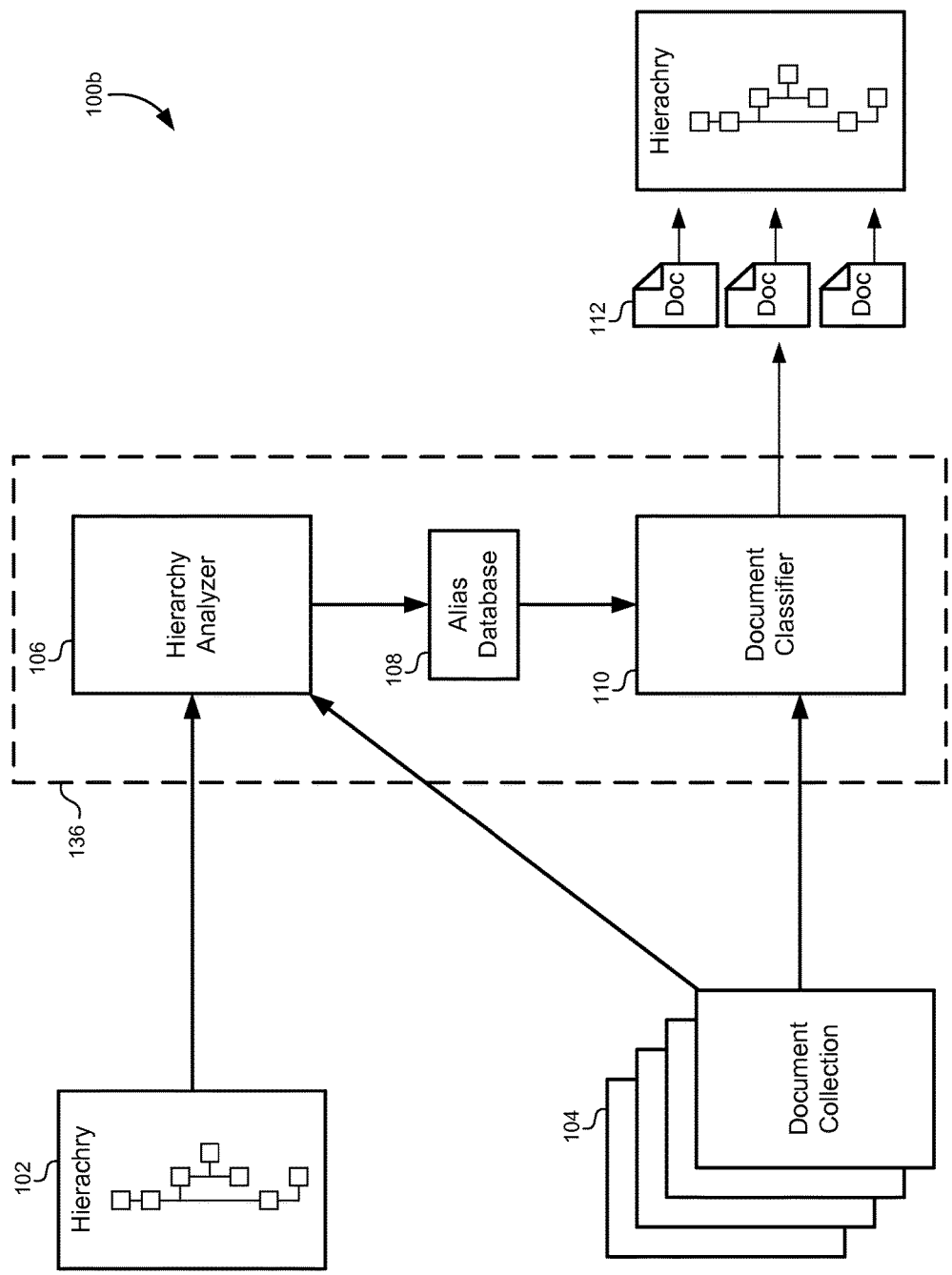

HIERARCHICAL DATA CLASSIFICATION USING FREQUENCY ANALYSIS

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

BRIEF SUMMARY

In some embodiments, a method of classifying individual documents in a document collection according to a hierarchy may include selecting an object from the hierarchy and generating one or more variants for the object. For each of the one or more variants, the method may also include determining a frequency threshold based at least in part on how frequently the one or more variants occurs in the document collection. The method may additionally include selecting a first document in the document collection, where the first document may include one or more objects that match at least one of the one or more variants. The method may further include determining that the number of the one or more objects exceeds the frequency threshold and, based at least in part on the determination that the number of the one or more objects exceeds the frequency threshold, classifying the first document with the object in the hierarchy.

In some embodiments, a non-transitory computer-readable medium may be presented. The computer-readable memory may comprise a sequence of instructions that, when executed by one or more processors, causes the one or more processors to perform operations including generating one or more variants for the object. For each of the one or more variants, the operations may also include determining a frequency threshold based at least in part on how frequently the one or more variants occurs in the document collection. The operations may additionally include selecting a first document in the document collection, where the first document may include one or more objects that match at least one of the one or more variants. The operations may further include determining that the number of the one or more objects exceeds the frequency threshold and, based at least in part on the determination that the number of the one or more objects exceeds the frequency threshold, classifying the first document with the object in the hierarchy.

In some embodiments, a system may be presented. The system may include one or more processors and one or more memory devices. The one or more memory devices may include instructions that, when executed by the one or more processors, cause the one or more processors to perform operations including generating one or more variants for the object. For each of the one or more variants, the operations may also include determining a frequency threshold based at least in part on how frequently the one or more variants occurs in the document collection. The operations may additionally include selecting a first document in the document collection, where the first document may include one or more objects that match at least one of the one or more variants. The operations may further include determining that the number of the one or more objects exceeds the frequency threshold and, based at least in part on the determination that the number of the one or more objects exceeds the frequency threshold, classifying the first document with the object in the hierarchy.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 1B illustrates a simplified block diagram of a system for analyzing hierarchies and document collections together, according to some embodiments.

DETAILED DESCRIPTION

Figure 1A:
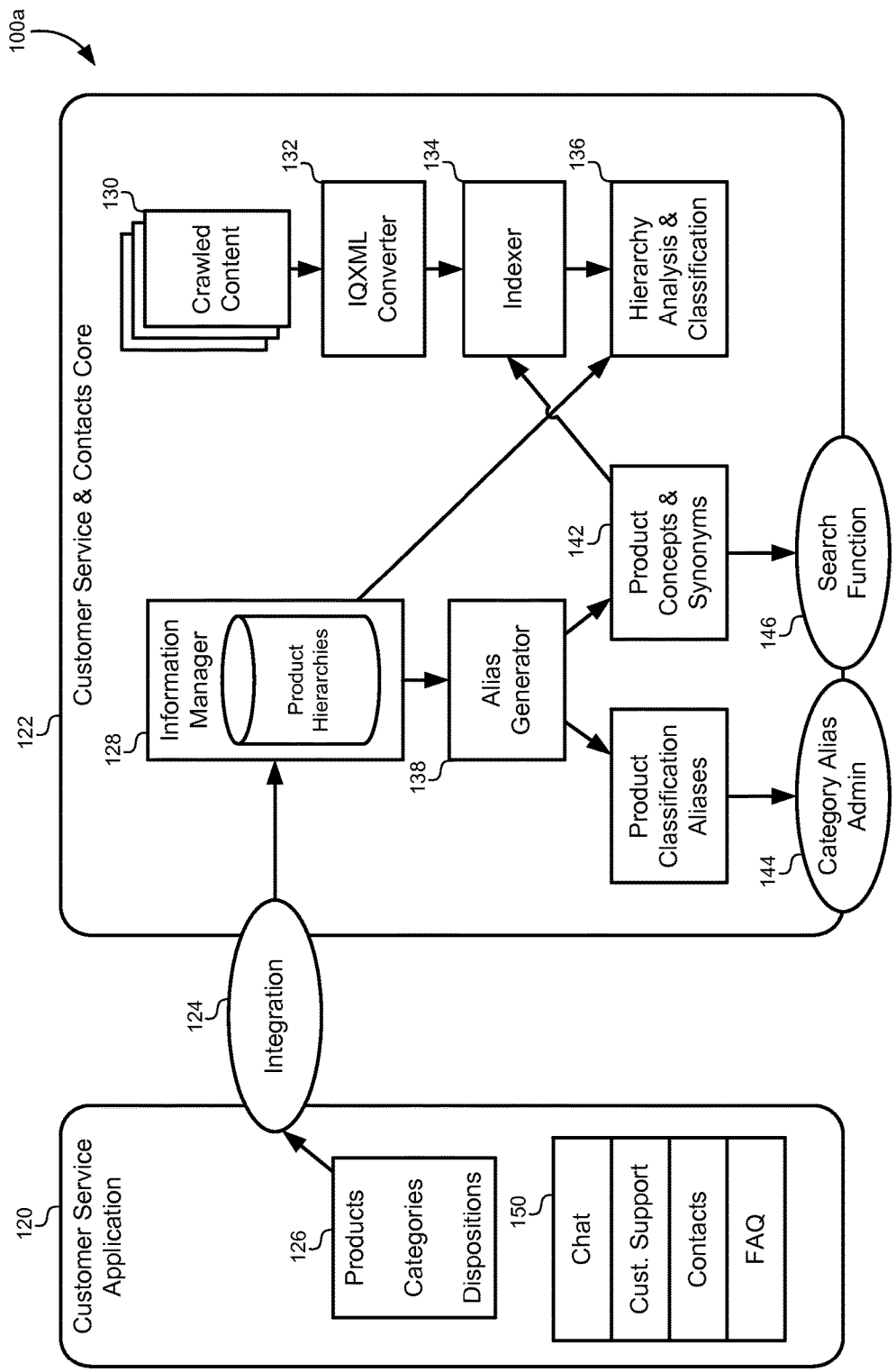
FIG. 1A illustrates a block diagram of a system using hierarchies and digesting external content, according to some embodiments.

A major problem facing businesses and institutions today is that of information overload. Sorting out useful documents from documents that are not of interest challenges the ingenuity and resources of both individuals and organizations. One way to sift through numerous documents is to use keyword search engines. However, keyword searches have limitations. One major drawback is that keyword searches do not discriminate by context. In many languages, a word or phrase may have multiple meanings, so a search may result in many matches that are not related to the desired topic. For example, a query on the phrase "river bank" might return documents about the Hudson River Bank & Trust Company, simply because the word "bank" has two meanings. An alternative strategy is to have human beings sort through documents and classify them by content using tags. This may provide better results, but it is not feasible for very large document collections. Manual category assignments for metadata and content classification tags can become particularly problematic when a knowledge management system is incorporating documents external to an enterprise. For example, some systems will incorporate web domains, external databases, transcriptions of phone conversations, frequently asked questions lists, social media forums, and so forth. Because each of these document types will vary considerably with regards to content and structure, it can be very difficult for human operators to manually assign category tags to each document accurately.

The embodiments described herein describe methods and systems for automatically classifying content based on a predefined hierarchy. The operations can generally be divided into a two-step process: analyzing an incoming document collection and a hierarchy together to generate aliases and search strategies, and then searching documents individually using the aliases and search strategies to generate a final classification for each document within the hierarchy. For each alias, a frequency analysis can be performed on the document collection, and a frequency threshold can be determined in order to identify individual documents to match. During the classification phase, the location of each alias found in the document can influence how the document is classified. In some embodiments, the list of aliases generated can be further refined by generating safety scores, generating value scores, and removing aliases that do not appear in the document collection or that represent non-meaningful categories in the hierarchy.

The embodiments described herein may be particularly effective in determining what a document is about, rather than simply identifying keywords that are mentioned. For example, a document that is about a new smart phone device will most likely mention keywords related to the smart phone. On the other hand, another document may make mention of the new smart phone device a couple of times, but the document may be about an entirely different subject, and the identified smart phone keywords may be only tangential to the main subject of the document.

Furthermore, the classification methods provided herein can operate in the absence of any existing tags or hierarchical information in a document. For example, these embodiments can take documents that are already classified in other hierarchies, and instead of focusing on the organizational tags in the documents, the content itself can be analyzed for subject matter that fits within a separate predefined hierarchy. However, if tag information exists, these embodiments can incorporate these tags into the analysis as well.

FIG. 1A illustrates a block diagram 100a of a system using hierarchies and digesting external content, according to some embodiments. It will be understood that the methods and systems for classifying a document collection according to a hierarchy described herein can be used in any system that would benefit from classifying incoming data without relying solely on pre-existing classification tags. In the embodiment of FIG. 1A, an architecture for a customer service application 120 is illustrated as one exemplary operating environment for classifying a document collection. The customer service application 120 may be comprised of a frontend that includes a number of different customer service modules 150, such as customer chat, customer support, frequently asked questions, customer contact management, social networking, and so forth. The customer service application 120 may operate at a customer location as part of a customer's enterprise software system. Alternatively or additionally, the customer service application 120 may be a cloud-based service accessible over the Internet. These hardware architectures are discussed in greater detail later in this disclosure in FIGS. 8-10.

The customer service application 120 may make use of a number of different hierarchies 126, such as a product hierarchy, a category hierarchy, a disposition hierarchy, and so forth. These different hierarchies 126 can be managed through an integration module 124 by one or more backend core systems. In this example, one of many core systems that can be coupled to the customer service application 120 is a customer service and contacts core 122. This example illustrates how a product hierarchy can be managed by the customer service and contacts core 122 in order to integrate new content that may arrive external to the system. An information manager 128 may replicate at least some of the hierarchies 126 used by the customer service application 120, such as the product hierarchy and categories hierarchy. The information manager 128 may generally associate a set of tags with each category that can be synchronized with the hierarchies 126 in the customer service application 120. As customers change these hierarchies 126 in the customer service application 120, they will be dynamically synchronized with hierarchies in the information manager 128.

The customer service and contacts core 122 may include a search function 146 that allows customers to interface with the product hierarchy to search for information relevant to a particular product. In order to match concepts expressed in a search query with concepts represented by nodes in the product hierarchy, an alias generator 138 can generate alternative ways to express each node in the product hierarchy, and the product concepts and synonyms module 142 can use the generated aliases to match concepts in the product hierarchy with concepts in a search query. Additionally, a category alias administration module 144 can allow an administrator to view the generated aliases and manually adjust how these aliases are generated and assigned.

The architecture described thus far can seamlessly be used with previously tagged content, such as content generated by the customer or internal to the enterprise. Such content will often be tagged by the creator of the content with tags that are part of the product hierarchy. For example, when a customer generates a user manual for a particular hardware router, the customer would typically tag the user manual with product hierarchy tags corresponding to the hardware router, the router family, and/or other router characteristics (e.g. gigabit, RX 3500 series, two port, etc.). However, external content may also be useful as part of the customer service application 120 that was not generated by the customer or internal to the enterprise. For example, a customer may wish to integrate content from a web domain that includes a number of different webpages that were generated outside of the customer's enterprise. Customers may also wish to integrate database information after an acquisition or information purchase. Customers may wish to interface with third-party sites that include product information, such as discussion forums. In short, customers may wish to use any type of information that was not tagged with product hierarchy tags when created for providing customer service through the customer service application 120. The embodiments described herein provide additional systems that facilitate categorizing this external, untagged content.

Generally, the external content will be referred to generically herein as a "document collection." This term should be interpreted broadly to refer to any external content that can be divided into logical units. For example, a document collection may include a web domain including a plurality of webpages. A document collection may also refer to a database including a number of different tables. A document collection may refer to a collection of PDF documents, and so forth. While the document collection may occasionally be described as "untagged," it will be understood that these embodiments can handle tagged documents as well. Some document collections may include tags for hierarchies generated by other entities, such as by a website owner that does not necessarily coincide with the hierarchy of the customer. These embodiments can either disregard these tags or use them as part of the classification process.

In the example of FIG. 1A, the document collection can be imported into the customer service and contacts core 120 as crawled content 130 from an external source, such as an external website. In order to standardize the many different types of external content formats that may be imported (e.g. PDF, HTML, XML, Word, database tables, etc.) the system may include a conversion module 132 that converts each of the documents in the crawled content 130 into a standard format. In this example, a particular version of XML can be used, such as the IQXML format used by the Oracle® Corporation. Other formats can be used that are compatible with a particular type of indexer 134 used to analyze the converted documents. Many different indexing products can be used for the indexer 134, such as a Lucene® index that generates both forward and reverse indexes of the crawled content 130.

A hierarchy analysis and classification system 136 can be configured to accept a document collection that has been indexed with a forward and/or reverse index. The hierarchy analysis and classification system 136 can also be configured to accept a pre-existing hierarchy. The hierarchy analysis and classification system 136 can perform a two-step process where the hierarchy is analyzed together with the document collection to generate a set of aliases and search strategies to be used on the document collection. Then, each individual document in the document collection can be searched for matches with the generated aliases and the search strategies can be applied to determine a final document classification within the hierarchy.

FIG. 1B illustrates a simplified block diagram 100b of a system for analyzing hierarchies and document collections together, according to some embodiments. As described above, the system can accept, as an input, a predefined hierarchy 102. Depending on the particular embodiment, the predefined hierarchy 102 may include a product hierarchy, an organizational hierarchy, a topic hierarchy, and so forth. The predefined hierarchy 102 may include tags associated with each node, or may simply include a text label for each node. The second type of input may include a document collection 104. The document collection may include tags for a different hierarchy, or may be completely untagged. The document collection may also be converted into a standardized format and indexed to include a word index and/or reverse index prior to beginning the classification process.

The hierarchy analysis and classification system 136 can be subdivided into two main processes: a hierarchy analyzer 106 and a document classifier 110. The hierarchy analyzer can analyze both the predefined hierarchy 102 and the document collection 104 together to generate aliases. As used herein, the term "alias" and the term "variant" may be used interchangeably to refer to one or more alternative labels that can be assigned to a node in a hierarchy. In some embodiments, aliases may include synonyms, or alternative names for a particular product. As will be described in greater detail below, some embodiments may generate aliases that are based on combining nodes along a generation of the hierarchy to form a product name. Each node may contribute a token, or single word/phrase in the product name, and aliases may be generated by rearranging tokens and transforming the product name using a set of predefined transforms.

The hierarchy analyzer 106 will develop a final set of aliases, each of which may be associated with a frequency threshold and other strategies that can be used to locate the alias in single documents of the document collection 104. It should be noted that some embodiments may analyze the entire document collection 104 as a whole when calculating the frequency threshold. This can be contrasted with the operation described below that is performed by the document classifier 110, which uses this frequency threshold in comparison to a frequency statistic generated from an individual document in document collection 104. Because the hierarchy analysis and document classification processes may be performed separately, the aliases generated by the hierarchy analyzer 106 can be stored in an alias database 108. The stored aliases in the alias database 108 can later be retrieved by the document classifier 110 when classifying the document collection 104. An example of a database entry in the alias database 108 is described further below in relation to FIG. 5.

While the hierarchy analyzer 106 considers the document collection 104 as a whole when generating frequency statistics, the document classifier 110 can consider each document individually using the aliases and search strategies stored in the alias database 108. In short, the document classifier 110 can cycle through each document in the document collection 104 and determine a number of alias matches from the alias database 108. Aliases derived from the same node in the predefined hierarchy 102 can be combined to determine how many times aliases related to a particular node appear in each document. This can then be compared to the previously derived frequency threshold. Additionally, the document classifier 110 can take into account the location in each document where the aliases occur. For example, an alias occurring in the title, header, and/or URL of the document usually indicates that the document should be classified under the corresponding node of that alias with relative certainty. Aliases occurring in the body of the document may typically require more occurrences in order to be classified under that alias with the same level of certainty.

The output of the document classifier 110 is a set of classifications 112 that can be assigned to the documents in the document collection 104. These classifications may be stored in a database such that referencing a particular node in the hierarchy will retrieve any documents classified under that node. This can be useful in a search application where a plurality of facets (e.g. product categories) are displayed to a user. The user can select facets/categories that are of interest, and the search results can be restricted to only display documents classified within those categories. In other embodiments, the search application can determine an intent category for a received search query. That intent category can then be matched to a particular node in the hierarchy, and the documents classified under that node can then be returned as part of the search results.

Figure 2:
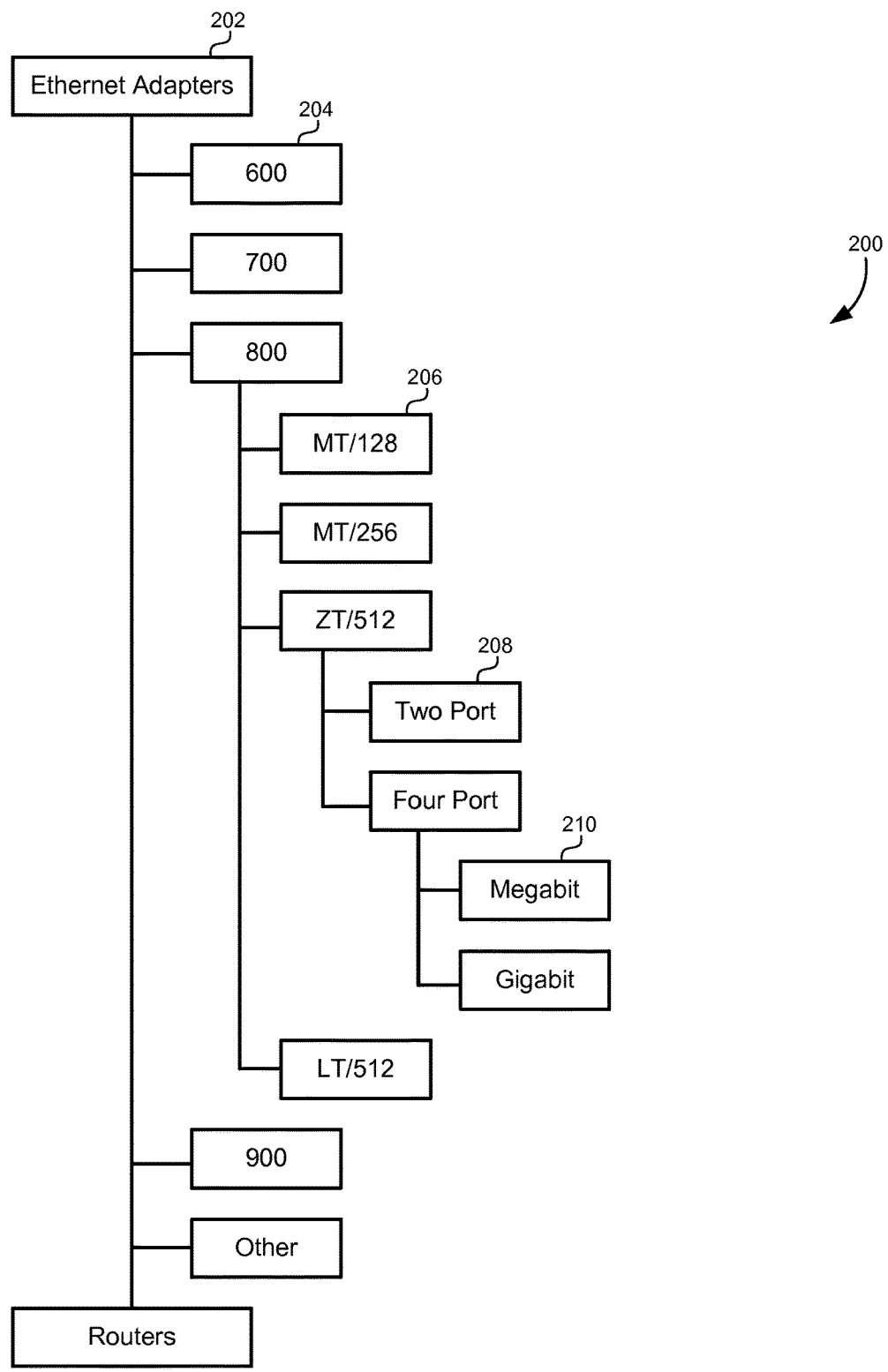
FIG. 2 illustrates an exemplary diagram of a product hierarchy, according to some embodiments.

FIG. 2 illustrates an exemplary diagram of a hierarchy 200, according to some embodiments. In order to describe the alias generation and document classification systems, the hierarchy of FIG. 2 will be used for exemplary purposes. It will be understood that any other type of hierarchy could be used with these systems, including business organizational hierarchies, contact hierarchies, software design hierarchies, and so forth. The particular hierarchy 200 illustrated by FIG. 2 is a product hierarchy specifically illustrating a product line of network devices, such as ethernet adapters and routers. In this case, a customer selling network devices would generate their own product hierarchy 200 in the customer service application 120. This product hierarchy 200 would be synchronized with the product hierarchy stored in the information manager 128 of the customer service and contacts core 122 of FIG. 1A.

In this example, the customer may sell ethernet adapters that are identified in a first level 202 of the hierarchy 200. A second level 204 of the hierarchy 200 may identify a series designation for different ethernet adapter products. By drilling down into the 800 series, a third level 206 of the hierarchy 200 may designate particular product numbers for ethernet adapters in the 800 series. Continuing further into the hierarchy 200, a particular product number (e.g. ZT/512) may use a fourth level 208 and/or a fifth level 210 of the hierarchy 200 to designate features or options of the particular product (e.g., two port/four port, megabit/gigabit, etc.).

After analyzing the hierarchy 200 of FIG. 2, individual node labels might not be very descriptive of a particular product by themselves. For example, a particular product number (e.g. ZT/512) in the third level 206 of the hierarchy 200 may be related to many different ethernet adapter products with different features/options. For example, the ZT/512 product number may also appear in the 700 series, the 600 series, and so forth. Therefore, in order to generate a descriptive product name that can be accurately matched to terms that would appear in documents, such as user manuals or discussion forums, aliases may be generated based on generational lines within the hierarchy that combine individual nodes together. For example, the full product name of a particular ethernet adapter may be "800 ZT/512 Four Port Gigabit" or some variation thereof. Therefore, when generating aliases from the predefined hierarchy, many different aliases for a particular product can be generated by a thorough analysis of the product hierarchy that extends past the individual node. A thorough explanation of how aliases can be generated from the product hierarchy 200 will be presented later in this disclosure.

In some embodiments, a single reference in a document to the "800 ZT/512 Two Port Gigabit" ethernet adapter could be accurately matched to multiple levels in the hierarchy 200, such as the second level 204, the third level 206, the fourth level 208, and the fifth level 210. In some cases, this would cause clustering of documents being matched in the hierarchy 200 at higher levels that are not as descriptive or helpful in a search as the lower levels. Therefore, some embodiments will optimize the classification using a "lowest-in-branch" principle where when a document is matched to more than one node along the generational line of the hierarchy 200, the document will be classified in the lowest node in that generational line. For instance, a document about the 800 ZT/512 Four Port Gigabit ethernet adapter would be classified under the "Gigabit" node of the fifth level 210 of the hierarchy 200, even though it could also be matched to aliases generated under the "Four Port" node of the fourth level 208 of the hierarchy 200, as well as the "ZT/512" node of the third level 206 of the hierarchy 200, and so forth. This optimization will counterbalance the tendency for documents to cluster at higher-level generic nodes by preferring the lower matching nodes within a branch of the hierarchy 200.

Figure 3:
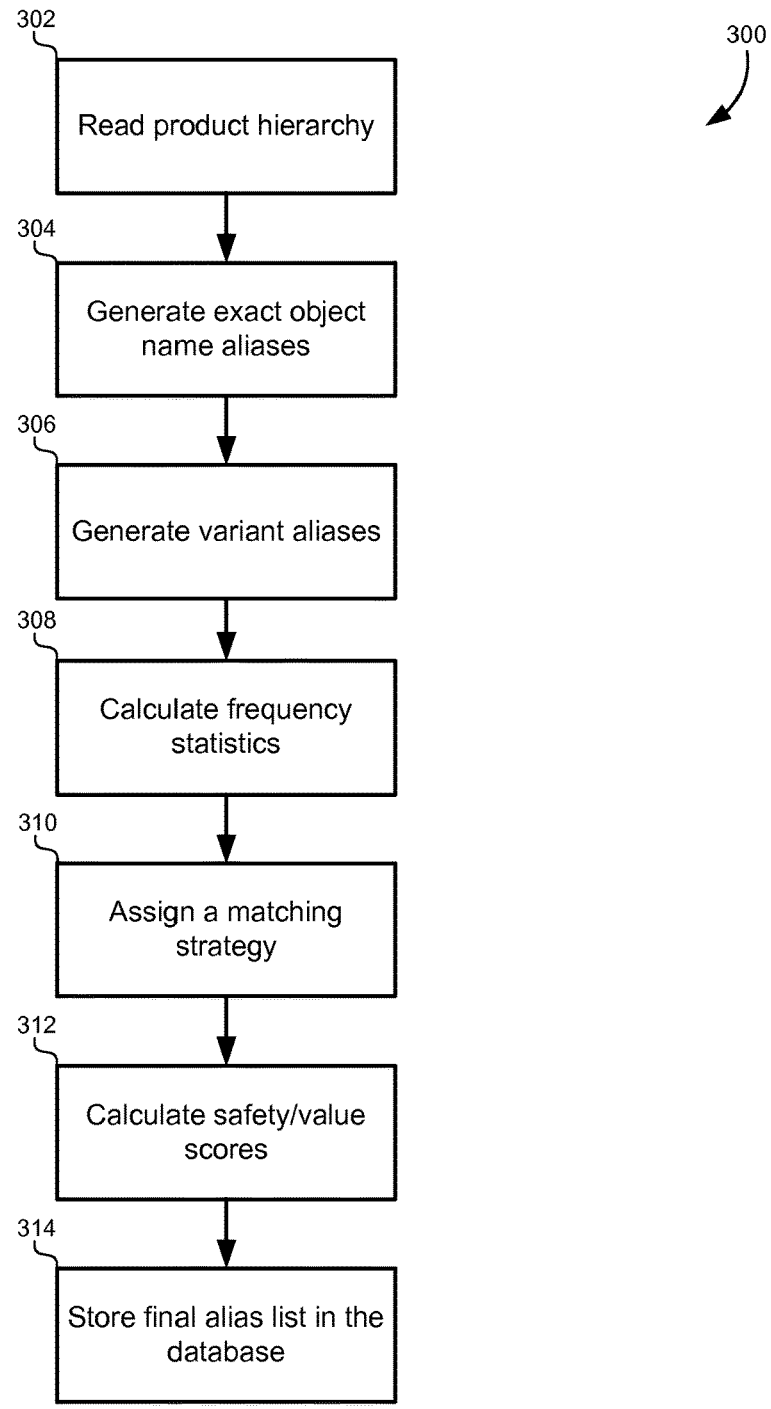
FIG. 3 illustrates a flowchart of a method for generating aliases, according to some embodiments.

FIG. 3 illustrates a flowchart 300 of a method for generating aliases, according to some embodiments. This method may be performed by the hierarchy analyzer 106 of FIG. 1B, and may represent the first stage in the document/hierarchy analysis and classification process. The method may include reading the product hierarchy (302). Because the product hierarchy is synchronized between the customer service application 120 and the information manager 128, the hierarchy analyzer 106 may read the hierarchy from the information manager 128. In some embodiments, the system can first determine whether new aliases need to be generated at all. For example, when there are no new document collections to analyze, or if none of the existing document collections have been changed, then any previously generated aliases and search strategies may still be valid. However, when a change in the product hierarchy is detected, or when changes/additions to one or more document collections being imported are detected, the system may automatically read the product hierarchy and begin generating new aliases.

The method may additionally include generating exact object name aliases (304). As described above, exact name object aliases refer to product names that can be generated by combining information from nodes in the hierarchy within the same generational line. For example, at the lowest level node, the exact name object alias would include "800 ZT/512 Four Port Gigabit." In contrast, at a higher level node, the exact name object alias would be "800 ZT/512." In some embodiments, the exact object name alias can be constructed by combining the label of the current node with labels of one or more parent nodes in the hierarchy.

The method may further include generating variant aliases (306). Generating variant aliases comprise a multi-step process that generates permutations of individual tokens within the exact product name aliases. For example, "800 ZT/512 Four Port Gigabit" may be rewritten in numerous permutations that may occur in the document collection, such as "ZT/512 800 Four Port Gigabit", "800 ZT/512 Gigabit Four Port", "Gigabit 800 ZT/512 Four Port", and so forth. Additionally, aliases may be generated that remove and/or replace punctuation or acronyms with alternative text. For example, "800 ZT/512 Four Port Gigabit" could generate an alias of "800 ZT 512 Four-Port Gigabit" where punctuation has been substituted for other common variations. Generally, these variant aliases can be generated using a library of defined transformations. These transformations will be described in greater detail below in reference to FIG. 5.

The method may also include calculating frequency statistics (308). One particular frequency statistic can be generated is a number of occurrences for each alias as they appear in the document collection. Instead of simply generating aliases and search strategies based on the hierarchy alone, these embodiments will analyze the hierarchy together with the document collection as as a whole. By incorporating some information from the document collection, the list of aliases and search strategies can be generated in a more intelligent manner that will more accurately classify data and can minimize the processing time and memory resources required for the classification process.

Calculating the frequency of an alias in the document collection can set a relative baseline for determining whether a particular document in the document collection simply makes mention of a product or is actually about a product. For example, if the entire document collection makes repeated mention of a particular product, then a single document would require a higher number of instances of that product name (or other matching alias) in order to confidently say that the document "was about" the particular product. In contrast, if the entire document collection makes very little mention of a particular product, then a single document would require a fewer number of instances of that product name (or other matching alias) in order to confidently say that the document "was about" the particular product.

The frequency statistics for a particular alias may include other values besides the number of occurrences. For example, the frequency statistics may include a standard deviation that would be indicative of how clustered the alias occurrences were in the document collection (i.e., were a large number of occurrences clustered in only a few documents, or were they more spread out through the document collection?). The frequency statistics may be used to generate a frequency threshold for a particular document in the document collection. The frequency threshold may be proportional to the number of occurrences in the entire document, balanced with the standard deviation. For example, an alias occurring 25 times and regularly distributed across 10 documents may generate a frequency threshold of 5 occurrences in any particular document in order to be classified under that alias. In another example, an alias occurring 100 times across 10 documents, but clustered in only three of those documents may generate a frequency threshold of 25 occurrences in any particular document in order to be classified under that alias. In another embodiment, the system can determine a number of documents in which each alias occurs. This distribution can be analyzed mathematically, and using a standard deviation, a determination can be made whether the alias falls into a high, medium, or low frequency range of the plurality of documents. During the evaluation of individual documents, a combination of all frequencies in the hierarchy of aliases can be combined to generate a fixed minimum frequency lower limit to be used as the frequency threshold.

The method may additionally include assigning a matching strategy to each alias (310). As used herein, the term "matching strategy" may be used synonymously with the terms "search strategy" and/or simply "strategy." These terms refer to selecting a particular method of analyzing a particular document using a particular alias. For example, one search strategy may be labeled "Not in Document," and may be used as a label for aliases that are generated but not found in any of the documents of the document collection. For aliases labeled "Not in Document" the system may skip searching any individual documents for that particular alias. In another example, a search strategy may be labeled "Skip" to designate aliases that contain nothing more than a "skip word." Skip words are labels that may appear in a hierarchy but do not add any sort of intelligence to classifying documents for a customer service or search engine. For example, many hierarchies will include the catch-all word "Other" at the base level of many product lines to capture any information related to the product line that does not pertain specifically to a particular product. Generally, the embodiments described herein will avoid classifying a document under a skip-word alias because this adds little value to the customer support system.

Another example of a search strategy may be determining whether to follow a segmented strategy or a normal strategy. A segmented strategy may be required when a product name occurs more than once in the product hierarchy. Many hierarchies do not require that each node be unique, but instead may allow multiple lines in the hierarchy to refer to the same product. For example, a node for "Two Port" may occur many different times in the hierarchy and refer to many different products. In order to determine whether a segmented strategy should be followed, the hierarchy can be traversed for each particular alias to determine whether that alias appears in any other nodes. If it does, the segmented strategy can require that if a document is to be classified under a particular alias, it must also qualify for classification under the alias of a parent node. This adds context to each alias in order to distinguish between different products with similar features.

Another example of a search strategy may be determined based on the frequency of the alias in the document collection. For example, for a high-frequency alias, a strategy may require a high frequency threshold. For a low-frequency alias, a strategy may only require a low frequency threshold.

The method may also include calculating safety scores and/or value scores (312). Whenever an alias is generated and a strategy is applied to that alias, the alias will deviate away from the exact name object alias to some degree. Strategies can be more or less reliable, and aliases can be more or less correct. Therefore, the system will assign a safety score to each alias/strategy combination, with each combination being more or less costly than others. The safety score reflects the confidence that the resulting alias and strategy will be found in the document collection. Generally, each transformation used to generate an alias can include a numerical penalty that can accumulate each time the alias is transformed. For example, an alias generated by three transforms (e.g. rearranging words, replacing punctuation, and limiting spaces) would generate a safety score that reflects the cumulative penalties for each of the three transforms. The baseline score could start at 1.0, and each transform could reduce the baseline score by 0.05-0.10, based on the severity of the transformed. Thus, for three transforms scored at 0.05 each, the safety score for the alias would be decreased to 0.85. This will generally result in lower safety scores for aliases that deviate farther away from the actual object product name. Value scores can be generated by determining how general an alias is compared to other aliases in the product line. Aliases that are very general may have a very low value score. The value score may be calculated based on how close to the bottom of the hierarchy the alias occurs. In another example, in a hierarchy that includes a generational line of "Tablets-> Model 506-> 7×11," the match to the alias "Tablets" would be given a lower value, than a match to the alias 'Tablets Model 506", which would have a lower value than a match to the alias "Tablets Model 506 7×11."

In some embodiments, whenever two different transformations produce the same alias, the alias with the lower safety score and lower value score can be removed. Additionally or alternatively, at the end of the alias generation process, the safety score and value score for each alias can be compared to a threshold safety score and a threshold value score, respectively. Aliases with scores falling below the threshold value(s) can be eliminated. Alternatively or additionally, any aliases falling within a bottom percentage of safety/value scores can be eliminated from consideration, or a predetermined number of aliases with the lowest safety/value scores can be eliminated from consideration.

The method may further include storing the final alias list in the database (314). As described above, the alias generation process may be executed separately from the document classification process. The final alias list may later be accessed by the document classification process by retrieving it from the database. In some embodiments, the final alias list may be stored along with the hierarchy, while in other embodiments the final alias list may be stored in a separate database such that the original hierarchy does not need to be accessed by the document classification process.

Figure 4:
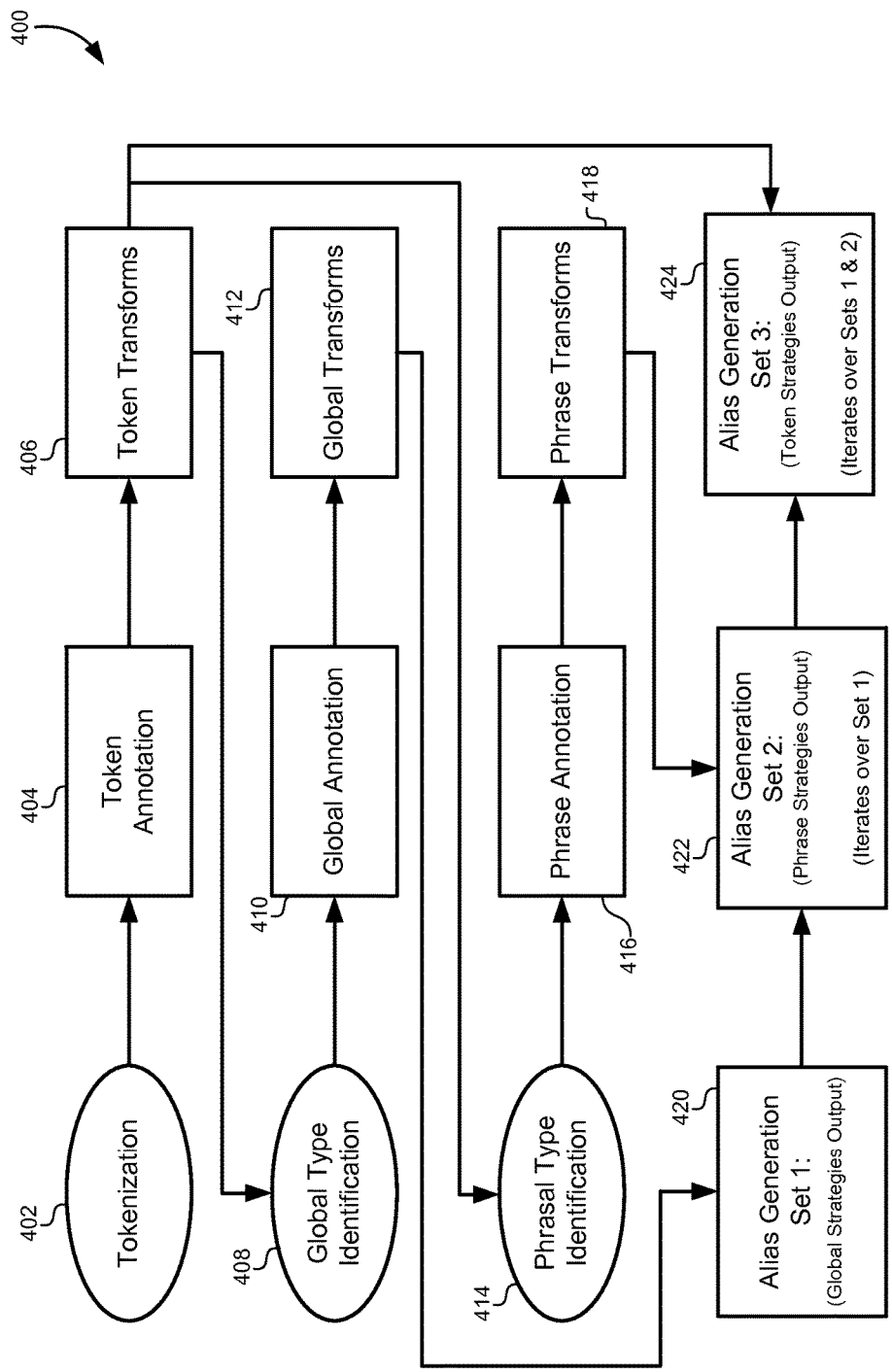
FIG. 4 illustrates a more detailed flowchart of a method for generating aliases, according to some embodiments.

FIG. 4 illustrates a flowchart 400 of a method for generating aliases, according to some embodiments. The method may begin with tokenization (402). Given a string of the product name (e.g. "800 ZT/512 Four Port Gigabit"), the first step is to tokenize the string and determine the types of individual tokens. Individual token types can include numbers, punctuation, grammatical words (prepositions, determiners, etc.), Boolean operators (and, or, etc.), a capitalization pattern, and so forth. In some embodiments, tokens can be split at spaces and punctuation marks, as well as at transitions between sequences of alpha characters and numerical characters. A token may be considered the smallest unit used to build an alias. After tokens are identified during the tokenization step, the tokens may be annotated (404) with this determined type information and a set of token transforms (406) may be used to generate aliases from the tokens. The token transforms used to generate aliases from tokens will be described in greater detail in Table 3 below.

After tokenization, the method may also include performing a global-type (product-name level) analysis (408). The number and types of tokens generated above allows the system to infer characteristics about the product name as a whole. For example, tokenization can indicate whether the product name is a single-token or multi-token product name. If it is a multi-token product name, then the tokens can indicate whether it contains a version and/or whether there are indications that the product name is a sub-type of a product line or family of products. The tokens can also indicate whether the product name contains a Boolean operator and the operands of such an operator. Overall, the global analysis of the product name as a whole provides a first decision point for a range of transforms that may be applicable for alias generation. Different transforms may be applicable to single-token product names compared to multi-token product names. Additionally, different transforms for generating aliases may be used for version and/or product-line-type product names compared to un-versioned product names. In another example, a product name that is a sequence of tokens could have those tokens reordered. The global-type analysis can generate annotations for the product name detailing this type of information (410), and one or more of the global transforms (412) described in Table 1 below can be implemented to generate aliases.

Next, a phrasal analysis (414) can be initiated. At this level, the product name can be split between tokens. For example, the product name can be split at spaces. This captures an intermediate level between the entire product name and the individual tokens. For example, in a product name such as "800 ZT/512 Four Port Gigabit", the substring phrase "ZT/512" contains three individual tokens: "ZT", "/", and "512". While these three individual tokens will form a phrase in the product name, they can also be analyzed individually within the phrase. When phrases are analyzed on the basis of the tokens they contain, this allows the system to select some transforms for alias generation that operate internally within the phrase, such as reordering the elements of the phrase, or removing some elements such as punctuation from within the phrase. Once this type of information is identified, phrasal analysis can generate annotations for phrases within the product name (416) and one or more of the phrasal transforms (418) described in Table 2 below can be implemented to generate aliases.

Each of the three analysis phases described above can generate its own set of aliases. As illustrated in FIG. 4, the aliases generated in each stage can be iterated over and used by other stages. In this particular embodiment, the aliases generated by the global-type analysis are the starting point of the iterative process (420). The global-type aliases can iterated with the phrasal-type aliases to eliminate duplicates and aliases with low value/safety scores (422). Finally, the resulting aliases can be iterated with the aliases generated by the token-level analysis to generate a final alias list without duplicates and without low value/safety scores.

The description above referred to transforms for generating aliases at the global level, phrasal level, and token level. The number and types of transforms the may be applicable at each level are extensive. Merely by way of example, the following tables illustrate a subset of the possible transforms that may be applied to generate aliases.

TABLE 1

Global (Product Names) Transforms

| Type | Sub-type | Definition | Transforms | Examples |
|---|---|---|---|---|
| Single Token | | | All-Caps, Internally-Capitalized | LAN, JavaScript |
| Multi-Token | Product Line or Family of Products-Typed | Contains number or ordinal ("II"), or single letter, or Product-Identifier-Phrase | Reorder-Product-Identifier-Local, Reorder-Phrase-Initial/Final, Reorder-Product-Identifier-Initial/Final, Reorder-Number-Initial/Final | Blueberry-709, Infinity S IId, SmartPhone 5p, |
| | Versioned | Contains Version-Phrase | Reorder-Version-Initial/Final | ACME 8.5.1 |
| | Contains Boolean | | Switch-Operands | Contacts and Audiences, Workspaces/Navigation Sets, |
| | Contains Measure | Contains a quantity or measure (abbreviation), or a dimension | Replace-with-Equivalent-Measure, Reorder-Phrase-Initial/Final | 11 × 14 Canvas Print, 16 oz. travel mug, |
| | isAcronym | | None (strategy is available at the phrase level) | L.A.N |

TABLE 2

Phrasal Transforms

| Phrase Type | Description | Strategies | Examples |
|---|---|---|---|
| Measure Phrase | Conveys a quantity, such as a dimension, i.e. a number plus unit of measure | Replace-with-Equivalent-Measure | oz., 11 × 15, 15", . . . |
| Conjoined Phrase | Contains a Boolean op and its arguments in a phrasal environment (Boolean op as punctuation, etc.) | Reorder-within-Conjoined-Phrase | SmartPhone 4/5p, Versions 5-thru-6, |
| Product Identifier Phrase | A combination of Short-Letter-Identifier and Number, possibly separated by punctuation | Reorder-within-Phrase | nGenius 1500 PFS, 100A Contactors, iPhone 5s, . . . |
| Acronym | A sequence of Capital Letters (2 to 5), possibly with periods in between | Acro-Expand-to-Dotted | LAN, L.A.N. |
| Acronym with Expansion | | Acro-Replace-With-Expansion, Acro-Remove-Expansion | LAN (Local Area Network) |
| Version Phrase | A sequence of numbers (optionally with single letters) with dot separators | Remove-Version-Separator, Replace-Version-Separator | 8.5.1, 10.6, . . . |

TABLE 3

Token Transforms

| Token Type | Description | Strategies | Examples |
|---|---|---|---|
| Short Letter Identifier | | Reorder-Local | |
| Short Letter Identifier followed by punctuation | | Reorder-within-Phrase | |
| Small Number | Single digit (n < 10) | Replace-with-Word-Equivalent | 1, 2, 3, . . . |
| Number | Other number (n > 9) | Reorder-Local | 12, 234, 5678, . . . |
| Punctuation | | Remove, Replace-with-Punctuation-Variant | "-", "/", "(", ")", "!", "?", "." |
| Boolean Operator | | Remove, Replace-with-Boolean-Variant, Replace-with-Punctuation-Variant | "and", "&", "or", "vs." |
| Internally Capitalized | Capital letter word-internal | Break-at-Capital-Letter | JavaScript |
| All-Caps Short | | Reorder-Local | |
| All-Caps | | Replace-with-Capitalized | |
| Other | None of the above | Replace-with-Standard-Variant (if applicable) | |

Figure 5:
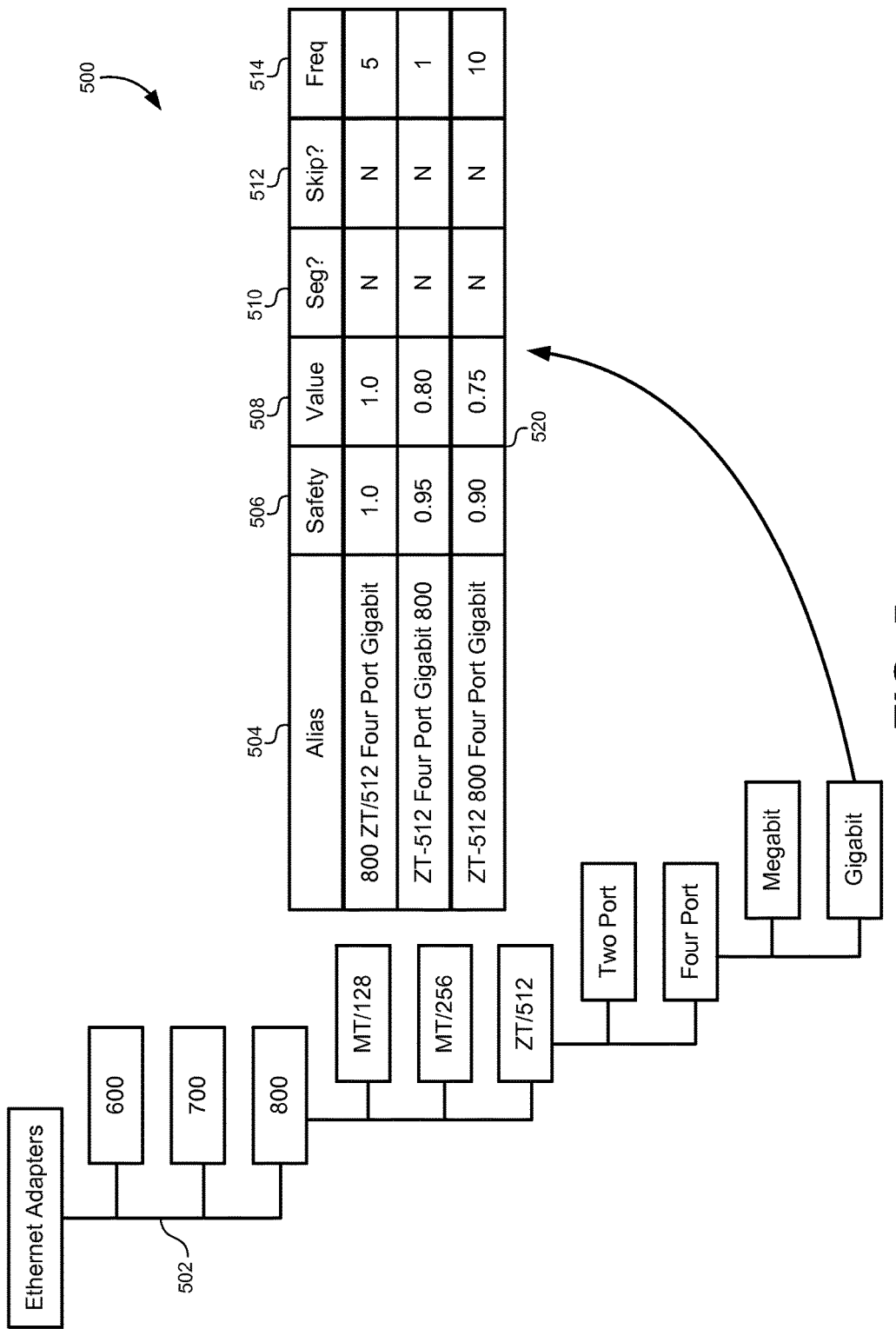
FIG. 5 illustrates an exemplary data structure for storing aliases in a database, according to some embodiments.

FIG. 5 illustrates an exemplary data structure 500 for storing aliases in a database, according to some embodiments. At the conclusion of the alias generation process, each surviving alias can be stored in the alias database along with information that can be used by the classification process to match the alias with object occurrences in individual documents of the document collection. In this example, a database table 520 can store aliases along with their associated values. Each entry in the table may include the alias string itself 504, a safety score 506, and/or a value score 508. Each entry may also include an indication 510 as to whether a segmented procedure should be followed for aliases that occur in multiple places in the hierarchy 502. Each entry may additionally include an indication 512 of whether the alias is a skip word, and/or a word not found in the document collection. Additionally, each entry may also include a frequency threshold 514 that can be used during the document classification process.

Figure 6:
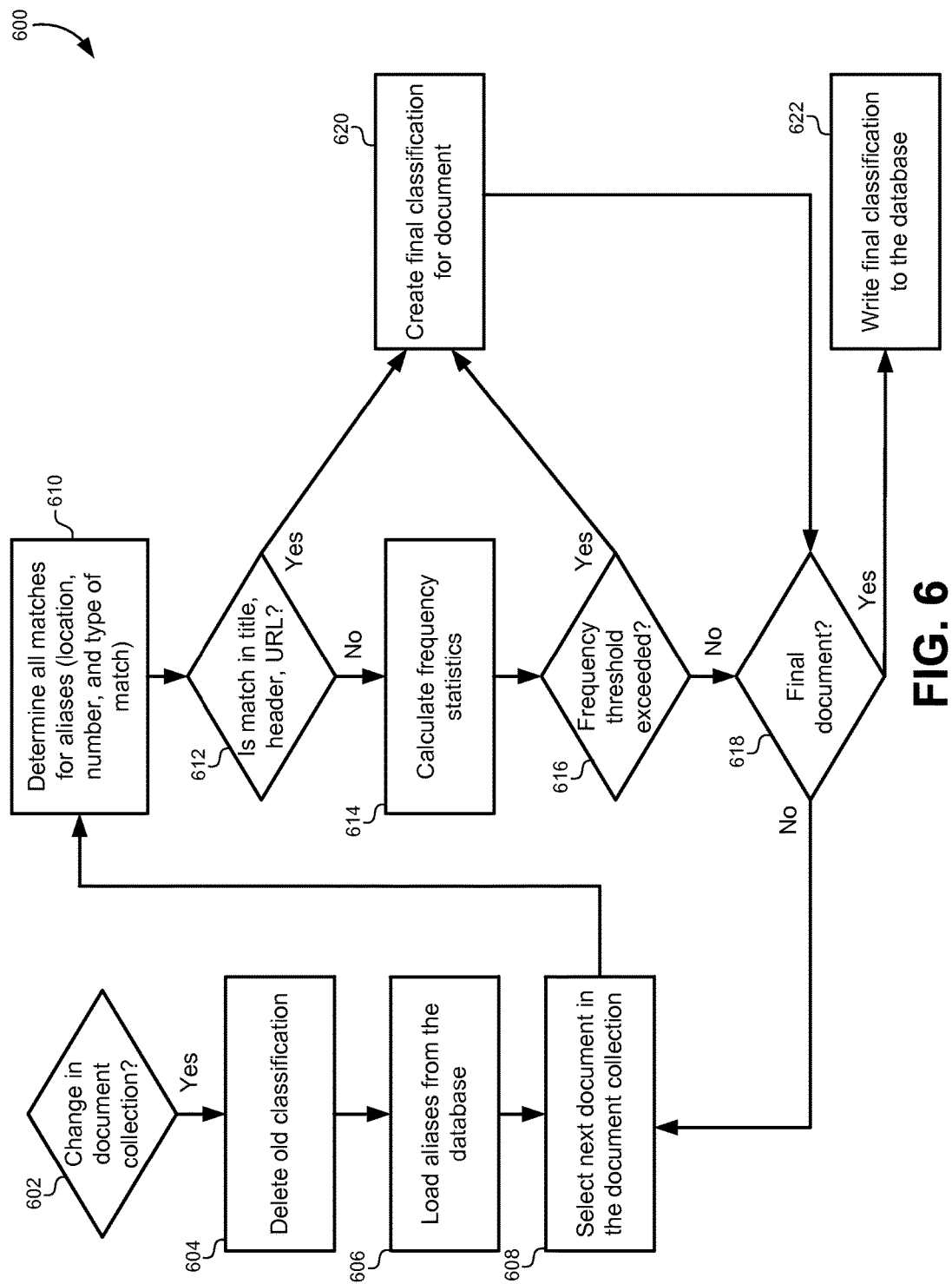
FIG. 6 illustrates a flowchart of a method for classifying content using generated aliases, according to some embodiments.

FIG. 6 illustrates a flowchart 600 of a method for classifying content using generated aliases, according to some embodiments. This method may be carried out by the document classifier 110 of FIG. 1B. The method may include determining whether there is a change in the document collection (602). As described above in relation to generating the aliases for the hierarchy, a change in the document collection and/or a change in the hierarchy itself may require the aliases to be re-generated and the documents in the document collection to be reclassified. If either of these conditions are met, the old classifications can be deleted (604) and the newly generated aliases can be loaded from the database (606).

At this point, the method can begin iterating through each of the documents in the document collection (608). The forward index and/or reverse index that accompanies the document collection may be used to determine all matches for all aliases in the document collection. Matching aliases can use a conventional string search and identification techniques that would be known to those having skill in the art. Along with determining whether a document includes an alias match, the method may also identify a location in each document where the match occurs (e.g., header, URL, title, body, etc.) along with the type of match (exact, 90%, etc.), And the number of matches in each document. For nodes in the hierarchy that include multiple aliases, the matches for all aliases can be combined under that node. For example, under the node for the product "800 ZT/512 Two Port Gigabit", matches can be aggregated for all alias variations, such as "ZT/512 800 Two Port Gigabit", "800 ZT/512 Gigabit Two Port", and/or "Gigabit 800 ZT/512 Two Port". Frequency thresholds can also be combined for each alias to generate an overall frequency threshold for the node in the hierarchy.

After locating alias matches, the method may include determining whether the location of the match should be determinative (612). If an alias is matched in the title, header, URL, or other document-identifying section of the document, then the document can be classified under the corresponding node in the hierarchy with high confidence. If an alias is not matched in a document identifying section of the document, then the method can proceed to analyzing frequency statistics for the particular document (614). In some embodiments, the method may calculate a number of occurrences of all aliases under a given node in the hierarchy that occur in the body (or non-document-identifying) sections of the document. The frequency statistic can then be compared to the frequency threshold calculated in the alias generation process described above (616). If the frequency statistic exceeds the frequency threshold for the individual alias or for the combined frequency threshold for the node in the hierarchy, then the document can be classified under that node in the hierarchy (620). This situation indicates that this particular document refers to that node in the hierarchy more than other documents in the document collection, indicating that the document most likely "is about" that topic in the hierarchy rather than simply mentioning the word. In some embodiments, the method may select the node in the hierarchy with the highest frequency of occurrence for classification. In some embodiments, the method may classify the document under all nodes in the hierarchy for which the frequency of occurrence exceeds the frequency threshold of the node.

After classifying a particular document, the method may move onto the next document (608) in the document collection. When the final document is classified (618), the method can write the final classification of the document collection to the database (622).

Figure 7:
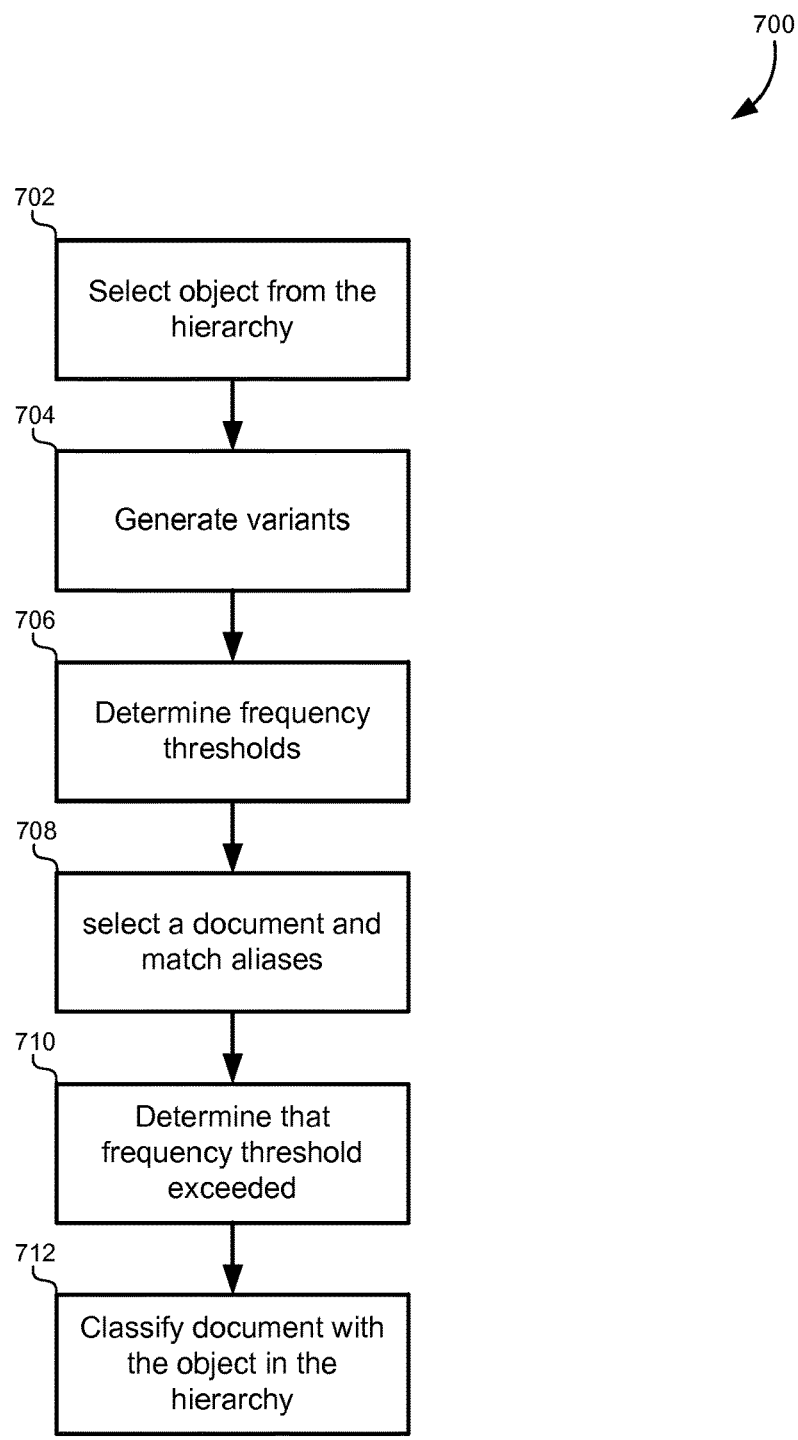
FIG. 7 illustrates a flowchart of a method for classifying individual documents in a document collection according to a hierarchy, according to some embodiments.

FIG. 7 illustrates a flowchart 700 of a method for classifying individual documents in a document collection according to a hierarchy, according to some embodiments. The method of flowchart 700 is a generalization of the combined methods for generating aliases and classifying documents described above for a single object in the hierarchy. An object in the hierarchy can include any node in any type of hierarchy, including the product identifier nodes in a product hierarchy described above. The method may include selecting an object from the hierarchy (702) and generating variants, or aliases, for that object (704). The method may also include determining a frequency threshold for the aliases based on an analysis of the document collection as a whole (706). In some embodiments, the frequency threshold will be proportional to the number of occurrences of the alias in the document collection as a whole, rising when the number of occurrences rise, and falling when the number of occurrences falls. The method may also include selecting a document from the document collection and matching the aliases to words in the document (708). In cases where the matches are not in document-identifying sections, such as a URL, header, and/or a title, a determination can be made as to whether the frequency threshold is exceeded (710). If the frequency threshold has been exceeded, the document can be classified under the object in the hierarchy (712).

It should be appreciated that the specific steps illustrated in FIGS. 3-4 and 6-7 provide particular methods of generating aliases and classifying documents according to various embodiments of the present invention. Other sequences of steps may also be performed according to alternative embodiments. For example, alternative embodiments of the present invention may perform the steps outlined above in a different order. Moreover, the individual steps illustrated in FIGS. 3-4 and 6-7 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 8:
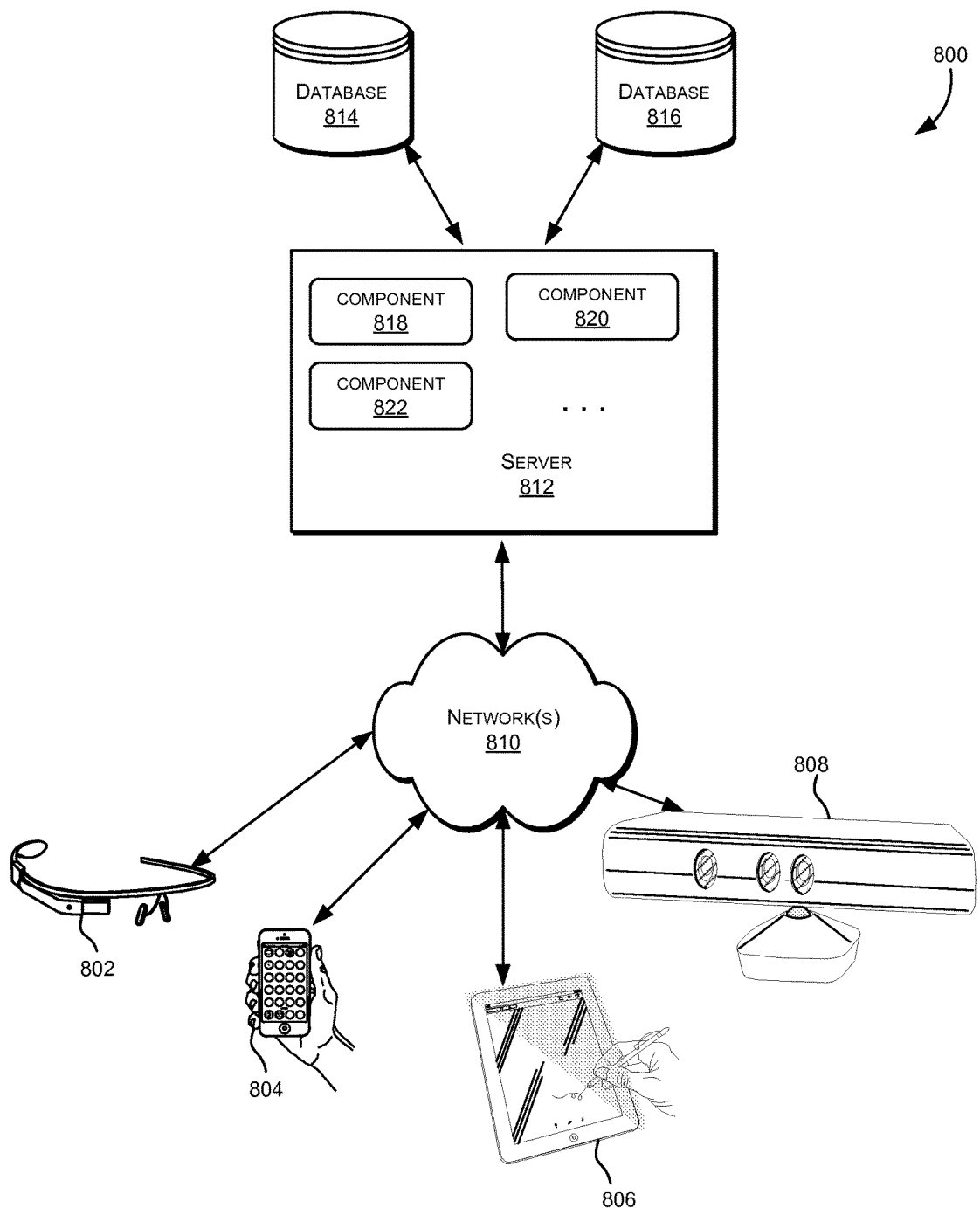
FIG. 8 illustrates a simplified block diagram of a distributed system for implementing some of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS)

model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
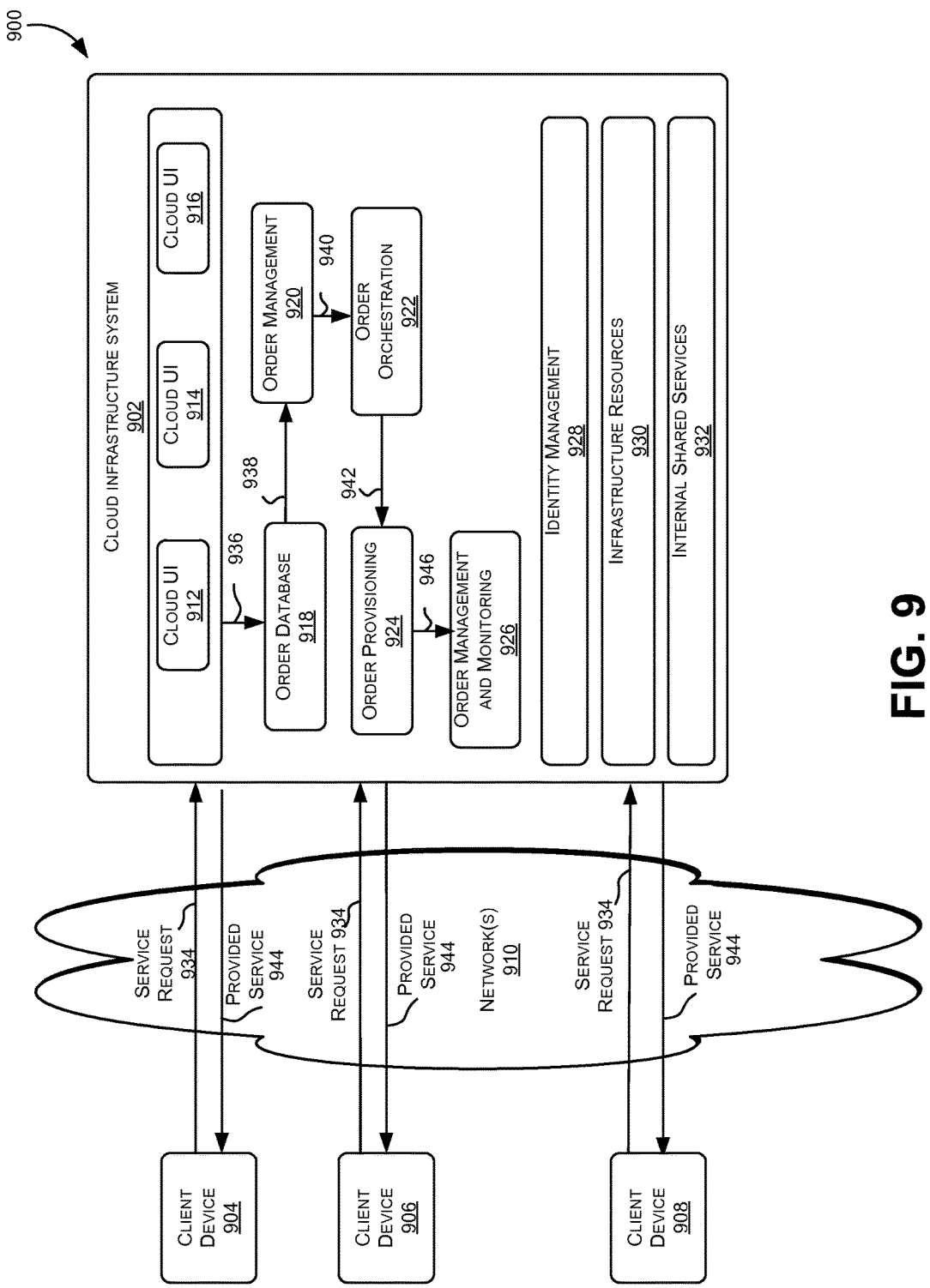
FIG. 9 illustrates a simplified block diagram of components of a system environment by which services provided by the components of an embodiment system may be offered as cloud services.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
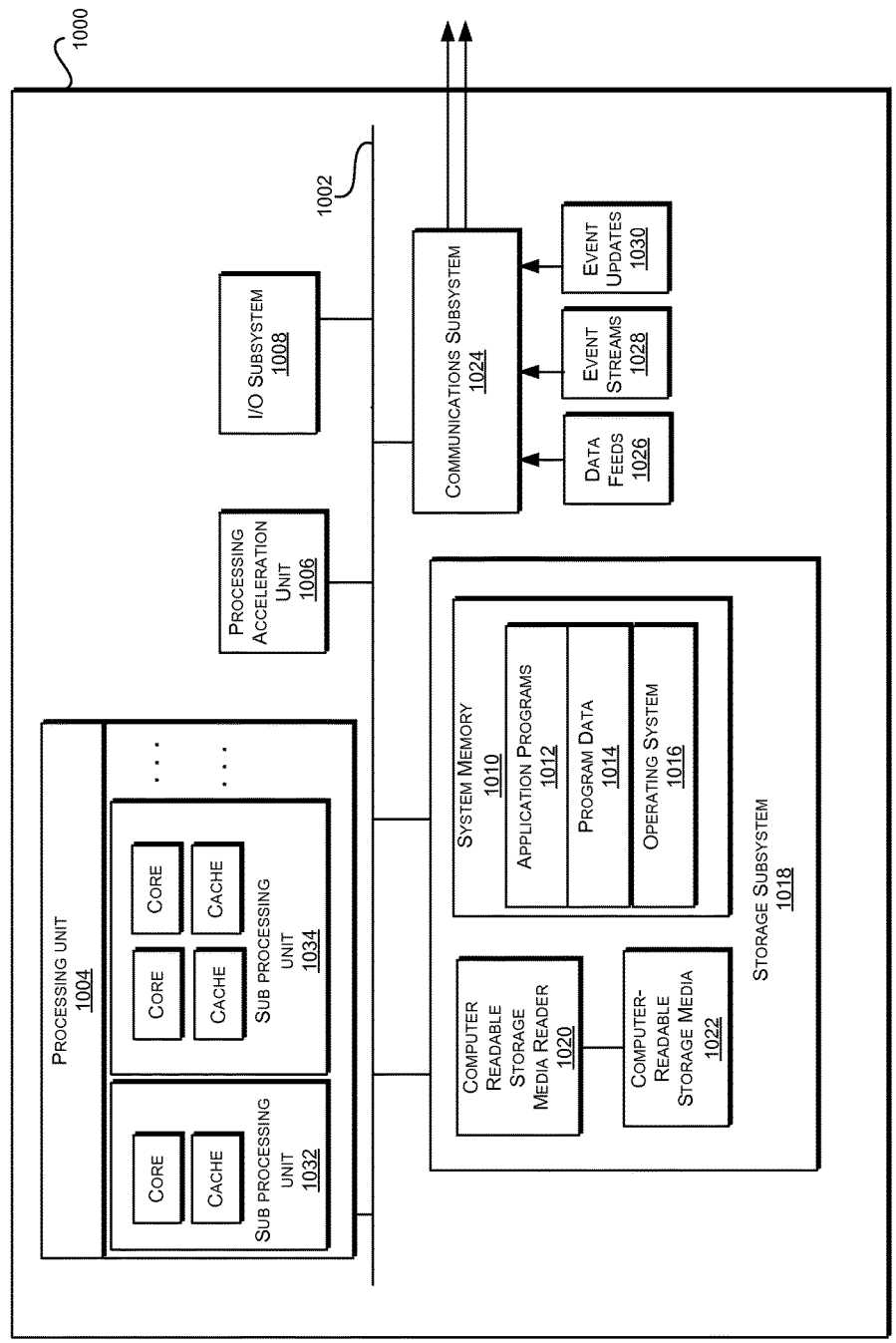
FIG. 10 illustrates an exemplary computer system, in which various embodiments may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A computer-implemented method of classifying individual documents in a document collection according to a hierarchy, the method comprising:
   selecting, by a processor, an object from the hierarchy;
   generating, by the processor, one or more variants for the object;
   for each of the one or more variants, determining a frequency threshold for individual documents based at least in part on how frequently the one or more variants occurs in the entire document collection;
   selecting, by the processor, a first document in the document collection, wherein the first document includes one or more objects that match at least one of the one or more variants;
   if the one or more objects that match are in a body section of the first document, determining, by the processor, that the number of the one or more objects exceeds the frequency threshold; and
   based at least in part on the determination that the number of the one or more objects exceeds the frequency threshold that was determined based on the entire document collection, classifying, by the processor, the first document with the object in the hierarchy.

2. The method of claim 1 wherein the hierarchy comprises a product tree.

3. The method of claim 1 wherein the object comprises a text string denoting a product in a product tree.

4. The method of claim 1 wherein generating the one or more variants for the object comprises combining the object with a parent object in the hierarchy.

5. The method of claim 1 wherein generating the one or more variants for the object comprises applying one or more transformations to a text string of the object to change an order of tokens in the text string.

6. The method of claim 1 wherein generating the one or more variants for the object comprises applying one or more transformations to a text string of the object to replace symbols in the text string with other symbols representing a same meaning.

7. The method of claim 1 wherein generating the one or more variants for the object comprises applying one or more transformations to a text string of the object to remove punctuation from the text string.

8. A non-transitory, computer-readable medium comprising instructions that, when executed by one or more processors, causes the one or more processors to perform operations comprising:
 selecting an object from the hierarchy;
 generating one or more variants for the object;
 for each of the one or more variants, determining a frequency threshold for individual documents based at least in part on how frequently the one or more variants occurs in the entire document collection;
 selecting a first document in the document collection, wherein the first document includes one or more objects that match at least one of the one or more variants;
 if the one or more objects that match are in a body section of the first document, determining that the number of the one or more objects exceeds the frequency threshold; and
 based at least in part on the determination that the number of the one or more objects exceeds the frequency threshold that was determined based on the entire document collection, classifying the first document with the object in the hierarchy.

9. The non-transitory, computer-readable medium of claim 8 comprising further instructions that, when executed by the one or more processors, cause the one or more processors to perform additional operations comprising:
 identifying a first variant in the one or more variants that does not occur in the document collection; and
 removing the first variant from the one or more variants.

10. The non-transitory, computer-readable medium of claim 8 comprising further instructions that, when executed by the one or more processors, cause the one or more processors to perform additional operations comprising:
 selecting a second object in the hierarchy, wherein the object comprises a first object;
 determining that the second object does not refer to a type of object in the document collection; and
 removing the second object from consideration for classifying documents in the document collection.

11. The non-transitory, computer-readable medium of claim 8 comprising further instructions that, when executed by the one or more processors, cause the one or more processors to perform additional operations comprising:
 determining that a first variant in the one or more variants occurs elsewhere in the hierarchy;
 identifying a parent object for the object; and
 when selecting the first document in the document collection that includes one or more objects that match the first variant, requiring that the one or more objects match a combination of the first variant and the parent object.

12. The non-transitory, computer-readable medium of claim 8 comprising further instructions that, when executed by the one or more processors, cause the one or more processors to perform additional operations comprising:
 calculating a safety score for each of the one or more variants, wherein the safety score indicates a number of transformations performed in order to generate the one or more variants from the object; and
 eliminating a first variant from the one or more variants upon a determination that a safety score for the first variant falls below a threshold.

13. The non-transitory, computer-readable medium of claim 8 comprising further instructions that, when executed by the one or more processors, cause the one or more processors to perform additional operations comprising:
 identifying documents in the document collection that include one or more objects that match at least one of the one or more variants; and
 classifying, with the object in the hierarchy, documents in the document collection for which a number of the one or more objects exceeds the frequency threshold.

14. The non-transitory, computer-readable medium of claim 8 comprising further instructions that, when executed by the one or more processors, cause the one or more processors to perform additional operations comprising:
 identifying a location in the first document of the one or more objects.

15. A system comprising:
 one or more processors; and
 one or more memory devices comprising instructions which, when executed by the one or more processors, cause the one or more processors to perform operations comprising:
  selecting an object from the hierarchy;
  generating one or more variants for the object;
  for each of the one or more variants, determining a frequency threshold for individual documents based at least in part on how frequently the one or more variants occurs in the entire document collection;
  selecting a first document in the document collection, wherein the first document includes one or more objects that match at least one of the one or more variants;
  if at least one of the one or more objects that match are in a body section of the first document, determining that a number of the one or more objects that are in the body section exceeds the frequency threshold; and
  based at least in part on the determination that the number of the one or more objects exceeds the frequency threshold that was determined based on the entire document collection, classifying the first document with the object in the hierarchy.

16. The system of claim 15 wherein the one or more memory devices comprises further instructions that, when executed by the one or more processors, cause the one or more processors to perform additional operations comprising:
 determining that a location in the first document of a first object in the one or more objects is in a header, title, or URL of the document; and
 classifying the first document with the object in the hierarchy based at least in part on determining that the location in the first document of the first object in the one or more objects is in the header, title, or URL of the document.

17. The system of claim 15 wherein the one or more memory devices comprise further instructions that, when executed by the one or more processors, cause the one or more processors to perform additional operations comprising:
   identifying a first variant in the one or more variants that is a skip word; and
   removing the first variant from the one or more variants.

18. The system of claim 15 wherein determining that the number of the one or more objects exceeds the frequency threshold is limited to objects occurring in a body of the document.

19. The system of claim 15 wherein the document collection comprises a web domain comprising a plurality of webpages.

20. The system of claim 15 wherein the document collection comprises documents that are:
   converted into a common XML format;
   forward and reverse indexed; and
   not tagged with tax related to the hierarchy.

* * * * *

UNITED STATES PATENT AND TRADEMARK OFFICE
CERTIFICATE OF CORRECTION

PATENT NO. : 10,262,061 B2
APPLICATION NO. : 14/716554
DATED : April 16, 2019
INVENTOR(S) : Brugger et al.

It is certified that error appears in the above-identified patent and that said Letters Patent is hereby corrected as shown below:

In the Specification

In Column 8, Line 52, delete "as as" and insert -- as --, therefor.

In Column 11, Line 64, delete "isAcronym" and insert -- is Acronym --, therefor.

Signed and Sealed this
Third Day of November, 2020

Andrei Iancu
*Director of the United States Patent and Trademark Office*